Figure 2:
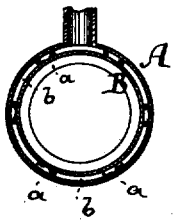

E. BIGELOW, dec'd., L. P. BIGELOW, admr'x.,

J. MATTHEWS, assignee by mesne assignments.

Liquid Cooler for Cooling Liquids Under Pressure.

No. 9,274. Reissued June 29, 1880.

Witnesses:

John C. Tunbridge

Willy J. E. Schultz.

John Matthews
assigned of
E. Bigelow, deceased
by his attorney
A. V. Briesen

N. PETERS, PHOTO-LITHOGRAPHER, WASHINGTON, D. C.

UNITED STATES PATENT OFFICE.

JOHN MATTHEWS, OF NEW YORK, N. Y., ASSIGNEE, BY MESNE ASSIGNMENTS, OF LUCY P. BIGELOW, ADMINISTRATRIX OF EDMUND BIGELOW, DECEASED.

LIQUID-COOLER FOR COOLING LIQUIDS UNDER PRESSURE.

SPECIFICATION forming part of Reissued Letters Patent No. 9,274, dated June 29, 1880.

Original No. 108,318, dated October 18, 1870. Application for reissue filed December 18, 1879.

DIVISION C.

*To all whom it may concern:*

Be it known that EDMUND BIGELOW, deceased, formerly of Springfield, in the county of Hampden and State of Massachusetts, has invented a new and useful Improvement in Liquid-Coolers for Cooling Liquids Under Pressure, of which the following is a specification.

The nature of this invention consists in so constructing and arranging a chamber in a cooler that the liquid to be cooled is brought in contact with the artificially-cooled outer and inner walls of the chamber in thin sheets, and is kept in contact with said walls for such part of the time occupied in its passage from the inlet to the outlet of the cooler as to reduce the liquid to a very low temperature with great rapidity.

That others may understand the invention, it is described as follows:

The best shape for the cooler is a cylinder or a series of cylinders connected together, though it is not confined to that precise form. In this description it will be spoken of as a cylinder or cylinders.

A metallic cylinder of suitable strength is made to resist the pressure of liquids charged with carbonic-acid gas, whether fermented liquids or liquids artificially aerated, and of suitable length and size for the ice-chest in which it is to be kept. In its exterior this cylinder presents no peculiar features. Within it is another cylinder, of metal and of suitable strength, so much less in size than the shell that when it is in place there is a space between its outer surface and the inner surface of the shell of one thirty-second part of an inch (more or less) in depth.

The two cylinders are held concentric by projections on the outer side of the inner cylinder, which projections reach to the outer cylinder, but do not interfere with the flow of the liquid in one stream between the cylinders, and do not break the continuity of the space between the two cylinders.

The supply-port is so arranged that the liquid to be cooled is let into the apparatus between the shell and the inner cylinder, and is immediately spread out into a sheet only one thirty-second part of an inch in thickness, and separated from the ice in which the cooler when in use is packed by only the thickness of the shell. The ends of the inner cylinder are open. The liquid carried through a cylinder of this construction is rapidly cooled.

Figure 1:
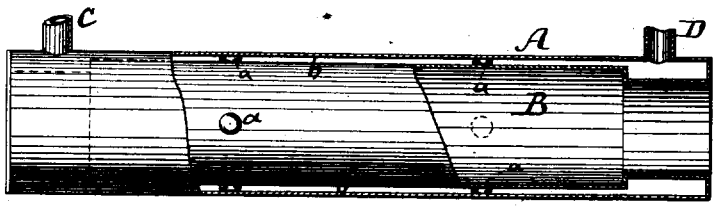
Figure 3:
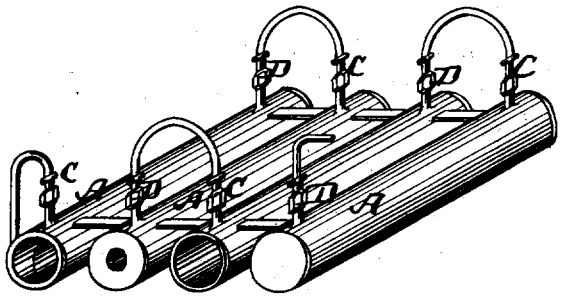

In the drawings, Figure 1 is a longitudinal section of the improved cooler. Fig. 2 is a transverse section of same. Fig. 3 is a perspective view of a series of such coolers connected together.

A is the shell, B the inner cylinder, C the inlet-pipe, and D the outlet-pipe, of the cooler. *a a* are projections on the outer side of the inner cylinder, reaching to the inner side of the outer shell. They serve to properly center the inner cylinder within the shell. The ends of the outer cylinder are closed.

The liquid enters the space *b*, between the two cylinders, through the pipe C. It is immediately spread out into a thin layer, and flows in one continuous stream through the space *b* along the entire length of the space *b*.

For the purpose of cooling soda-water on draft the cooler is most advantageously made with a series of cooling-cylinders connected together by suitable tubes, and of the proper length and size to be placed in the ice-compartment of the soda apparatus, as shown at Fig. 3.

I claim—

A cooler constructed with a closed outer cylinder, A, an open-ended inner cylinder, B, of interposed projections *a a*, which center the cylinder B, but do not interrupt the continuity of the space *b* between the two cylinders, and of an inlet-pipe, C, and outlet-pipe D, substantially as herein shown and described.

JOHN MATTHEWS.

Witnesses:
DAVID WHITE,
JOHN STEVENS.